United States Patent
Jiao et al.

(10) Patent No.: US 11,556,299 B1
(45) Date of Patent: Jan. 17, 2023

(54) METHOD FOR SEAMLESS SPLICING OF SPECIAL-SHAPED DISPLAY SCREEN AND LED DISPLAY SCREEN

(71) Applicant: YAHAM OPTOELECTRONICS CO., LTD, Guangdong (CN)

(72) Inventors: Weiqi Jiao, Guangdong (CN); Weicai Yang, Guangdong (CN); You Zeng, Guangdong (CN); Xiaodong Wei, Guangdong (CN)

(73) Assignee: YAHAM OPTOELECTRONICS CO., LTD, Guangdong (CN)

( * ) Notice: Subject to any disclaimer, the term of this patent is extended or adjusted under 35 U.S.C. 154(b) by 0 days.

(21) Appl. No.: 17/506,083

(22) Filed: Oct. 20, 2021

(51) Int. Cl.
| | |
|---|---|
| *G09G 3/3208* | (2016.01) |
| *G06F 3/14* | (2006.01) |
| *G09F 9/302* | (2006.01) |
| *G09G 3/32* | (2016.01) |
| *G09G 3/00* | (2006.01) |

(52) U.S. Cl.
CPC .......... *G06F 3/1446* (2013.01); *G09F 9/3026* (2013.01); *G09G 3/03* (2020.08); *G09G 3/32* (2013.01); *G09G 2356/00* (2013.01)

(58) Field of Classification Search
None
See application file for complete search history.

(56) References Cited

U.S. PATENT DOCUMENTS

2018/0315355 A1* 11/2018 Hu ................ G09G 3/3208

\* cited by examiner

*Primary Examiner* — Carl Adams
(74) *Attorney, Agent, or Firm* — Cantor Colburn LLP

(57) ABSTRACT

The present application relates to a method for seamless splicing of a special-shaped display screen, including: dividing the special-shaped display screen into a number of regular quadrilateral modules and a number of special-shaped modules; calculating a number of LED light pieces on a first side of a regular quadrilateral module after division; determining the number of the LED light pieces arranged on the first side of the regular quadrilateral module; calculating a number of LED light pieces arranged on a second side of the regular quadrilateral module, and the second side is adjacent to the first side; and continuing for the number of special-shaped modules obtained above.

13 Claims, 2 Drawing Sheets

METHOD FOR SEAMLESS SPLICING OF SPECIAL-SHAPED DISPLAY SCREEN AND LED DISPLAY SCREEN

TECHNICAL FIELD

The present application relates to the technical field of LED light splicing, and more particularly to a method for seamless splicing of a special-shaped display and a LED display screen.

BACKGROUND

At present, there are two types of special-shaped corners and arc-shaped structural boxes in the LED industry: the first is a flexible module, which can be fitted according to the actual shape of the display. The second is to combine a number of custom-shaped modules to form the overall shape of the special-shaped project.

However, the above two methods have one or several shortcomings. Among them, the flexible module can only be used in projects with a large arc with a large rounded angle. If the rounded angle is small, components such as PCB and LED lamps will not be able to be bent and deformed follow the arc, otherwise there is a risk of damage. In addition, the flexible modules currently on the market are all conventional squares or rectangles, and it is difficult to adapt to completely splice together special-shaped projects with different arcs. The conventional PCB module methods with customized shapes are also commonly used in the market. However, the splicing effects are poor, such as the flatness is poor, the splicing seam effect is poor, the LED lamps distribution is unscientific, and the obvious the phenomenon of brightness and darkness splitting is occurred.

SUMMARY

An object of the present application is to provide a method for seamless splicing of a special-shaped display screen, in order to solve the technical problem that the LED lamps distribution is unscientific, and the obvious the phenomenon of brightness and darkness splitting is occurred in the prior art.

The method for seamless splicing of a special-shaped display screen and the method includes:

S100: dividing the special-shaped display screen into a number of regular quadrilateral modules and a number of special-shaped modules;

S200: calculating a number of LED light pieces on a first side of a regular quadrilateral module after division according to a following equation:

$$N = X/n$$

wherein, X is a distance between two LED light pieces arranged at both ends of the first side of the regular quadrilateral module, and n is a distance between two adjacent LED light pieces;

S300: determining, if the calculated N is an integer, the number of the LED light pieces arranged on the first side of the regular quadrilateral module; or taking, if the calculated N is not an integer, three integers A, B, and C that are closest to N, respectively, calculating A/n, B/n, and C/n to obtain three values, and determining the integer corresponding to one of the three values with a smallest difference comparing with n as the number of the LED light pieces arranged on the first side of the regular quadrilateral module;

S400: calculating a number of LED light pieces arranged on a second side of the regular quadrilateral module according to steps S200 to S300, wherein the second side is adjacent to the first side; and

S500: continuing to repeat the steps S100-S400 for the number of special-shaped modules obtained in the step S100.

In addition to one or more of the features described above, or as an alternative to any of the foregoing embodiments, in the step of dividing the special-shaped display screen into a number of regular quadrilateral modules and a number of special-shaped modules, the regular quadrilateral modules are one or more selected from a group of square modules, rectangular modules, and isosceles trapezoidal modules.

In addition to one or more of the features described above, or as an alternative to any of the foregoing embodiments, in the step of dividing the special-shaped display screen into a number of regular quadrilateral modules and a number of special-shaped modules, the regular quadrilateral modules are a plurality of square modules, and sizes of the plurality of square modules are different.

In addition to one or more of the features described above, or as an alternative to any of the foregoing embodiments, in the step of dividing the special-shaped display screen into a number of regular quadrilateral modules and a number of special-shaped modules, the regular quadrilateral modules are a plurality of square modules, and sizes of the plurality of square modules are the same.

In addition to one or more of the features described above, or as an alternative to any of the foregoing embodiments, in the step of dividing the special-shaped display screen into a number of regular quadrilateral modules and a number of special-shaped modules, the regular quadrilateral modules are a plurality of rectangular modules, and sizes of the plurality of rectangular modules are different.

In addition to one or more of the features described above, or as an alternative to any of the foregoing embodiments, in the step of dividing the special-shaped display screen into a number of regular quadrilateral modules and a number of special-shaped modules, the regular quadrilateral modules are a plurality of rectangular modules, and sizes of the plurality of rectangular modules are the same.

In addition to one or more of the features described above, or as an alternative to any of the foregoing embodiments, in the step of dividing the special-shaped display screen into a number of regular quadrilateral modules and a number of special-shaped modules, the regular quadrilateral modules are a plurality of isosceles trapezoidal modules, and sizes of the plurality of isosceles trapezoidal modules are different.

In addition to one or more of the features described above, or as an alternative to any of the foregoing embodiments, in the step of dividing the special-shaped display screen into a number of regular quadrilateral modules and a number of special-shaped modules, the regular quadrilateral modules are a plurality of isosceles trapezoidal modules, and sizes of the plurality of isosceles trapezoidal modules are the same.

In addition to one or more of the features described above, or as an alternative to any of the foregoing embodiments, in the step S200, distances between the LED light pieces at both ends of the first side and an edge of the first side are n/2, and distances between the LED light pieces at both ends of the first side and an edge of the second side are n/2.

In addition to one or more of the features described above, or as an alternative to any of the foregoing embodiments, in the step S200, distances between the LED light pieces at both ends of the first side and an edge of the first side are (n−0.05)/2, and distances between the LED light pieces at both ends of the first side and an edge of the second side are (n−0.05)/2.

In addition to one or more of the features described above, or as an alternative to any of the foregoing embodiments, in the step S200, distances between the LED light pieces at both ends of the first side and an edge of the first side are ranged from (n−0.05)/2 to n/2, and distances between the LED light pieces at both ends of the first side and an edge of the second side are ranged from (n−0.05)/2 to n/2.

In addition to one or more of the features described above, or as an alternative to any of the foregoing embodiments, if the special-shaped display screen is a curved screen, a distance between the first side of the regular quadrilateral module and an outer arc of the curved screen is less than or equal to n.

The present application further provides a LED display screen, which includes one or more special-shaped display screens spliced by a method for seamless splicing of a special-shaped display; and the method includes:

S100: dividing the special-shaped display screen into a number of regular quadrilateral modules and a number of special-shaped modules;

S200: calculating a number of LED light pieces on a first side of a regular quadrilateral module after division according to a following equation:

$$N=X/n$$

wherein, X is a distance between two LED light pieces arranged at both ends of the first side of the regular quadrilateral module, and n is a distance between two adjacent LED light pieces;

S300: determining, if the calculated N is an integer, the number of the LED light pieces arranged on the first side of the regular quadrilateral module; or taking, if the calculated N is not an integer, three integers A, B, and C that are closest to N, respectively, calculating A/n, B/n, and C/n to obtain three values, and determining the integer corresponding to one of the three values with a smallest difference comparing with n as the number of the LED light pieces arranged on the first side of the regular quadrilateral module;

S400: calculating a number of LED light pieces arranged on a second side of the regular quadrilateral module according to steps S200 to S300, wherein the second side is adjacent to the first side; and S500: continuing to repeat the steps S100-S400 for the number of special-shaped modules obtained in the step S100.

In the method for seamless splicing of the special-shaped display screen of the present application, the special-shaped display screen is divided into regular quadrilateral modules and the remaining special-shaped modules, and then the numbers of LED lights arranged on the first side and the second side adjacent to the first side of the regular quadrilateral module are calculated, such that the LED lights arranged in each regular quadrilateral module are evenly distributed, and then the remaining special-shaped display screens are continued to be divided and calculated to obtain the number of LED lights in each area after the division, and then the distribution of the LED lights on the entire special-shaped display screen is even, thereby the obvious the phenomenon of brightness and darkness splitting is avoided.

BRIEF DESCRIPTION OF THE DRAWINGS

In order to more clearly describe the technical solutions in the embodiments of the present application, the following will briefly introduce the drawings needed in the description of the embodiments or the prior art. Obviously, the drawings in the following description are only of the present application. For some embodiments, those of ordinary skill in the art can obtain other drawings based on these drawings without creative labor.

DETAILED DESCRIPTION

Figure 1:
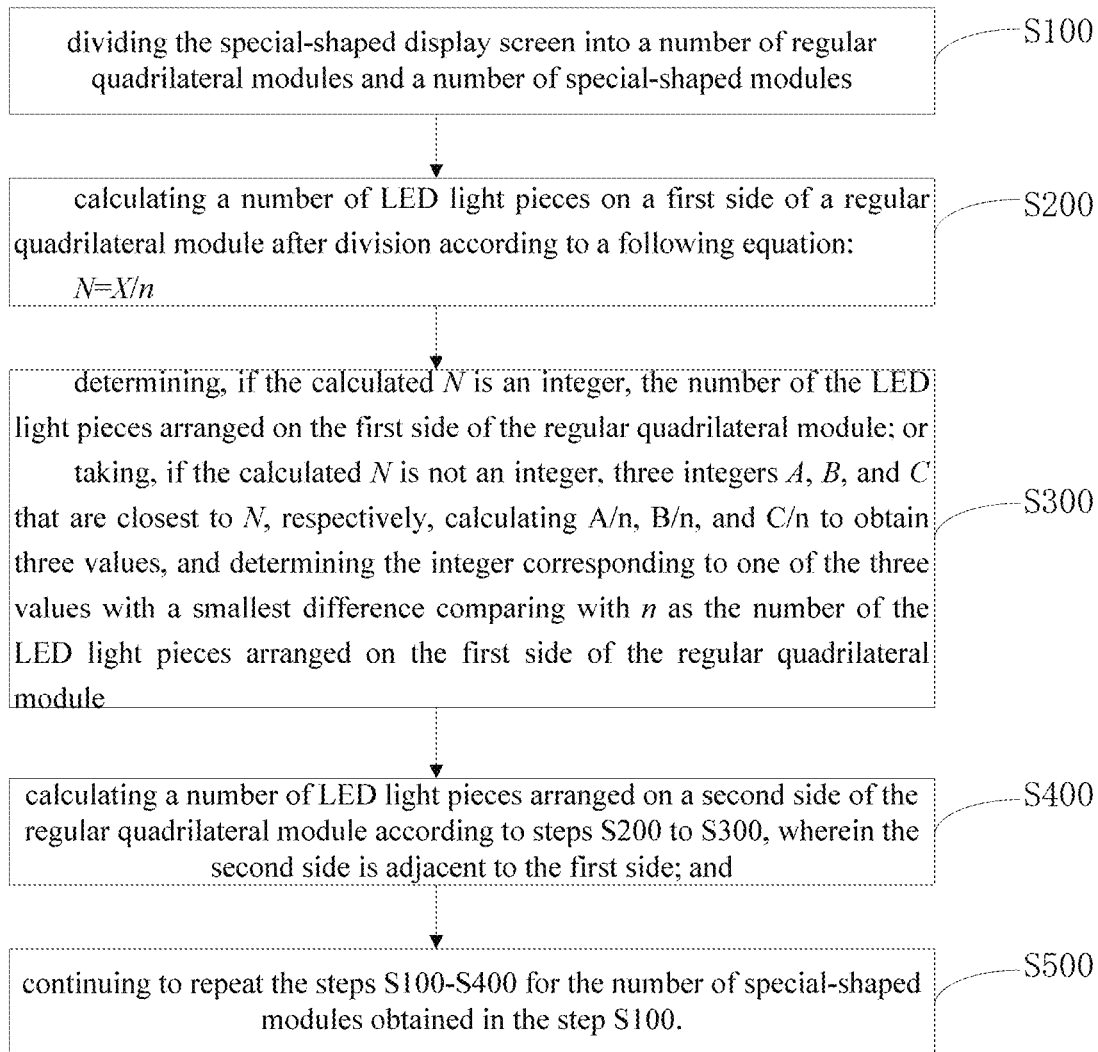
FIG. 1 is a flow-chart of a method seamless splicing of a special-shaped display screen of an embodiment according to the present application.

In order to make the technical problems, technical solutions, and beneficial effects to be solved by the present application clearer, the following further describes the present application in detail with reference to the accompanying drawings and embodiments. It should be understood that the specific embodiments described here are only used to explain the present application, and are not used to limit the present application.

It should be noted that when a component is referred to as being "fixed on" or "arranged on" another component, it can be directly on the other component or indirectly on the other component. When a component is said to be "connected" to another component, it can be directly or indirectly connected to the other component. The terms "upper", "lower", "left", "right", etc. indicate the orientation or positional relationship based on the orientation or positional relationship shown in the drawings, and are only for ease of description, and do not indicate or imply the device or the element must have a specific orientation, be constructed and operated in a specific orientation, and therefore cannot be understood as a limitation of the present application. For those skilled in the art, the specific meaning of the above terms can be understood according to specific conditions. The terms "first" and "second" are only used for ease of description, and cannot be understood as indicating or implying relative importance or implicitly indicating the number of technical features. The meaning of "plurality" means two or more than two, unless otherwise specifically defined.

Referring to FIG. 1, in an embodiment of the present application, a method for seamless splicing of a special-shaped display is provided, and the method includes the following steps:

Step S100: dividing the special-shaped display screen into a number of regular quadrilateral modules and a number of special-shaped modules.

The conventional special-shaped display screens are generally spherical, cone-shaped, trumpet-shaped or cylindrical display screens; among them, when the spherical and cone-shaped screens with varying side lengths are divided, and the regular quadrilateral modules obtained are generally isosceles trapezoid modules. Similarly, after the cylindrical display screen is divided, the regular quadrilateral modules obtained are generally square or rectangular modules.

In addition, there are some unconventional special-shaped display screens, regarding to this type of display screen, the regular quadrilateral modules and multiple special-shaped modules are divided as much as possible; furthermore, in step S100 of the present application, it needs to divide the special-shaped display screen based on actual shape thereof, and use the corresponding division scheme, that is, the regular quadrilaterals can be of the same type or a combination of different types; and the regular quadrilaterals of the same type may also be of different sizes.

That is, in step S100 of the present application, the regular quadrilateral modules may be one or more selected from a group of the square modules, the rectangular modules, and the isosceles trapezoidal modules. In one embodiment, the regular quadrilateral modules are a combination of the square modules, the rectangular modules, and the isosceles trapezoidal modules. In another embodiment, the regular quadrilateral modules are a combination of the square modules and the rectangular modules. In another embodiment, the regular quadrilateral modules are a combination of the rectangular modules and the isosceles trapezoidal modules. In another embodiment, the regular quadrilateral modules are a combination of the square modules and the isosceles trapezoidal modules.

In an embodiment of step S100 of the present application, the regular quadrilateral modules include a plurality of square modules, and the sizes of the plurality of square modules are the same. In another embodiment, the regular quadrilateral modules include a plurality of square modules, and the sizes of the plurality of square modules are different, or partially different.

In an embodiment of step S100 of the present application, the regular quadrilateral modules include a plurality of rectangular modules, and the sizes of the plurality of rectangular modules are different, or partially different. In another embodiment, the regular quadrilateral modules include a plurality of rectangular modules, and the sizes of the plurality of rectangular modules are the same.

In an embodiment of step S100 of the present application, the regular quadrilateral modules include a plurality of isosceles trapezoidal modules, and the sizes of the plurality of isosceles trapezoidal modules are different, or partially different. In another embodiment, the regular quadrilateral modules include a plurality of isosceles trapezoidal modules, and the sizes of the plurality of isosceles trapezoidal modules are the same.

Step S200: calculating a number of LED light pieces on a first side of a regular quadrilateral module after division according to a following equation:

$$N=X/n$$

wherein, X is a distance between two LED light pieces arranged at both ends of the first side of the regular quadrilateral module, and n is a distance between two adjacent LED light pieces.

Figure 2:
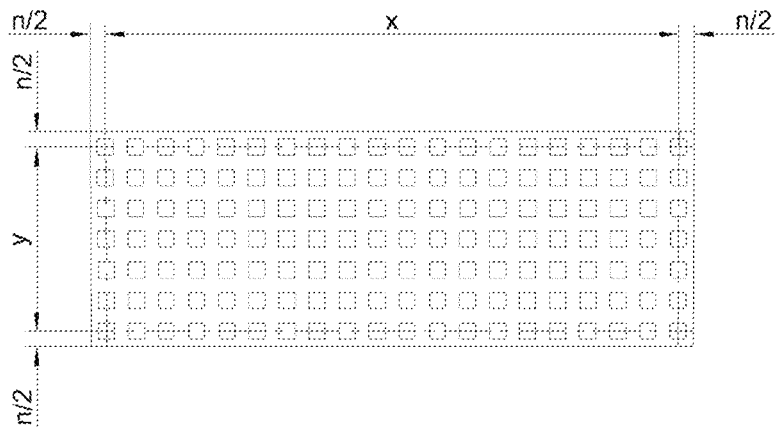
FIG. 2 is a schematic view of a number of LED light pieces in a regular quadrilateral module of a method seamless splicing of a special-shaped display screen of an embodiment according to the present application.

Referring to FIG. 2, in the step S200, a first side (such as the long side of the rectangle) of a regular quadrilateral module (such as a rectangular module) is first selected, and then two LED light pieces are arranged at both ends of the first side, a distance between the LED lights at the two ends of the first side is measured as X, the distance between adjacent two LED light pieces is preset as n, the number N of LED light pieces is calculated according to the equation: $N=X/n$.

Due that the number of the LED light pieces should be an integer, and the number of the LED light pieces is determined according to the step S300; as following:

S300: determining, if the calculated N is an integer, the number of the LED light pieces arranged on the first side of the regular quadrilateral module; or taking, if the calculated N is not an integer, three integers A, B, and C that are closest to N, respectively, calculating A/n, B/n, and C/n to obtain three values, and determining the integer corresponding to one of the three values with a smallest difference comparing with n as the number of the LED light pieces arranged on the first side of the regular quadrilateral module.

In an embodiment of the present application, it is assumed that the distance between the LED lights is n=4 mm; and the distance between the LED light pieces at both ends of the first side is X=24 mm; obviously, X/n can obtain an integer 6, and the number N of the LED light pieces arranged along the first side should be 6.

In another embodiment of the present application, it is assumed that the distance X between the adjacent two LED light pieces at both ends of the first side is X=74.974 mm; obviously, after calculating, the number N=18.7435, that is, the number N of the LED light pieces arranged along the first side should be 18.7435; since number N must be an integer and then the three integers A, B, and C that are closest to 18.7435 are selected; obviously, the A selects the integer 17, the B selects the integer 18, and the C selects the integer 19. Continuing determining the number N according to the preset equation (that is, A/n, B/n, and C/n), and obtaining three numerical values 4.410, 4.165 and 3.946 corresponding to selected integers 17, 18 and 19. Then comparing the obtained numerical values 4.410, 4.165 and 3.946 with the distance n (which is assumed to be 4 mm), obviously, the difference between numerical value 3.946 and the distance n is the smallest; therefore, the number N of LED light pieces on the first side of the regular quadrilateral module is determined, that is, N=19, and the corresponding distance n should be 3.946 mm. Through the above-mentioned solution optimization, the distance between adjacent two LED light pieces in a single module can be as close as possible to the set required distance.

Referring to FIG. 2, in an embodiment of the present application, in the above steps S200 and S300, it is preset that the distance between the LED light pieces at both ends of the first side and the edge of the first side is set to n/2; assuming that n=4 mm; The distance between two LED light pieces arranged at both ends of the first side and the edge of the first side is 2 mm. Such arrangement can avoid the phenomenon of brightness and darkness splitting after the split modules are spliced, eliminate the seam between the modules, and the brightness display of the entire special-shaped display screen can be more even.

Similarly, the distance between the LED lights at both ends of the second side adjacent to the first side and the edge of the second side is also set to n/2; such arrangement can also avoid the splitting of brightness and darkness after the split modules are spliced, eliminate the seam between the modules, and the brightness display of the entire special-shaped display screen can be more even.

In another embodiment of the present application, in the above steps S200 and S300, it is preset that the distance between the LED light pieces at both ends of the first side and the edge of the first side is set to (n−0.05)/2; assuming that n=4 mm; The distance between two LED light pieces arranged at both ends of the first side and the edge of the first side is 1.975 mm. Such arrangement can avoid product tolerance problems in the actual manufacturing process, and can also avoid the phenomenon of brightness and darkness splitting after the split modules are spliced, eliminate the seam between the modules, and the brightness display of the entire special-shaped display screen can be more even. The distance between the corresponding LED light pieces at both ends of the adjacent second side on the first side and the edge of the second side is also set to (n−0.05)/2.

In another embodiment of the present application, in the above steps S200 and S300, it is preset that the distance between the LED light pieces at both ends of the first side and the edge of the first side is set to be ranged from (n−0.05)/2 to n/2; assuming that n=4 mm; The distance between two LED light pieces arranged at both ends of the first side and the edge of the first side is ranged from 1.975 mm to 2 mm, for example, 1.980 mm, 1.985 mm, 1.990 mm or 1.995 mm. Such arrangement can avoid product tolerance problems in the actual manufacturing process, and can also avoid the phenomenon of brightness and darkness splitting after the split modules are spliced, eliminate the seam between the modules, and the brightness display of the entire special-shaped display screen can be more even. The distance between the corresponding LED light pieces at both ends of the adjacent second side on the first side and the edge of the second side is also set to be ranged from (n−0.05)/2 to n/2.

Figure 3:
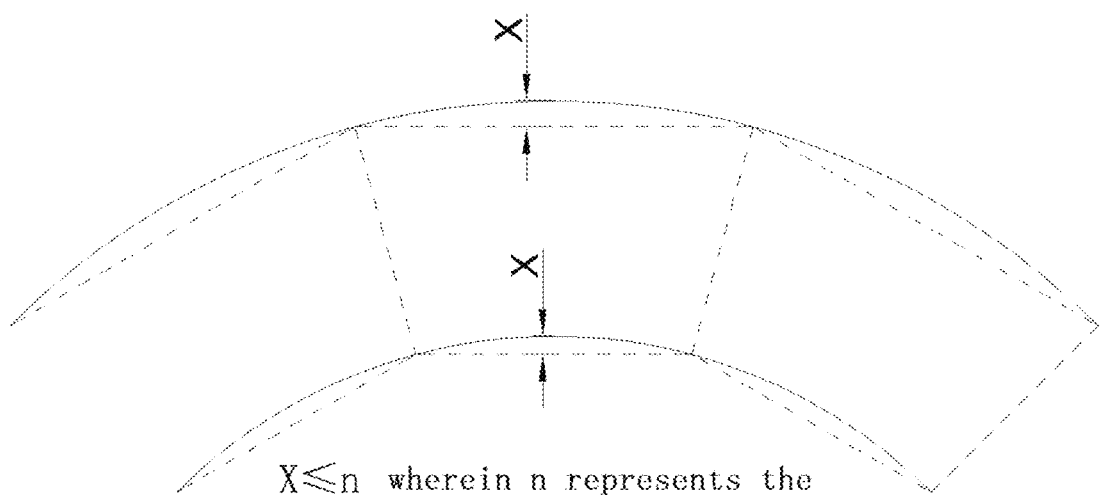
FIG. 3 is a schematic view of splicing a curved screen of a method seamless splicing of a special-shaped display screen of an embodiment according to the present application.

Referring to FIG. 3, in an embodiment of the present application, if the special-shaped display screen is a spherical or conical display screen, the corresponding regular quadrilateral after the module is divided is an isosceles trapezoid, and the distance between the bottom side of the isosceles trapezoid and the outer arc of the curved screen of the display screen is less than or equal to distance n. In this way, it can be ensured that the divided regular quadrilateral modules and a number of special-shaped modules are closer to actual needs.

S400: calculating a number of LED light pieces arranged on a second side of the regular quadrilateral module according to steps S200 to S300, wherein the second side is adjacent to the first side.

In the embodiment of the present application, the calculation of the arrangement number of the LED light pieces on the second side is similar in principle to that on the first side, and which is not repeated herein.

S500: continuing to repeat the steps S100-S400 for the number of special-shaped modules obtained in the step S100.

In the embodiment of the present application, according to the actual needs, if the area of the special-shaped modules are much smaller than the area of the regular quadrilateral, then a certain number of LED light pieces are directly arranged, or if the shape or area special-shaped module is difficult to arrange according to experience, so the corresponding special-shaped module is further divided into regular quadrilateral modules and smaller special-shaped modules, and then continue to repeat the above steps.

The present application further provides an LED display screen. The LED display screen includes one or more of the aforementioned special-shaped display screens. The special-shaped display screens are arranged by the method as following:

S100: dividing the special-shaped display screen into a number of regular quadrilateral modules and a number of special-shaped modules;

S200: calculating a number of LED light pieces on a first side of a regular quadrilateral module after division according to a following equation:

$N=X/n$ wherein, X is a distance between two LED light pieces arranged at both ends of the first side of the regular quadrilateral module, and n is a distance between two adjacent LED light pieces;

S300: determining, if the calculated N is an integer, the number of the LED light pieces arranged on the first side of the regular quadrilateral module; or taking, if the calculated N is not an integer, three integers A, B, and C that are closest to N, respectively, calculating A/n, B/n, and C/n to obtain three values, and determining the integer corresponding to one of the three values with a smallest difference comparing with n as the number of the LED light pieces arranged on the first side of the regular quadrilateral module;

S400: calculating a number of LED light pieces arranged on a second side of the regular quadrilateral module according to steps S200 to S300, wherein the second side is adjacent to the first side; and S500: continuing to repeat the steps S100-S400 for the number of special-shaped modules obtained in the step S100.

The above are only some embodiments of the present application and are not intended to limit the present application, and any modification, equivalent replacement and improvement made within the spirit and principle of the present application shall within in the protection scope of the present application.

The invention claimed is:

1. A method for seamless splicing of a special-shaped display screen, comprising the followig steps:
    S100: dividing the special-shaped display screen into a number of regular quadrilateral modules and a number of special-shaped modules;
    S200: calculating a number of LED light pieces arranged on a first side of a regular quadrilateral module after step S100 according to a following equation:

$N=X/n$ wherein, X is a distance between two LED light pieces arranged at both ends of the first side of the regular quadrilateral module, and n is a distance between two adjacent LED light pieces;
    S300: determining, if the calculated N is an integer, the number of LED light pieces arranged on the first side of the regular quadrilateral module; or
    taking, if the calculated N is not an integer, three integers A, B, and C that are closest to N, respectively, calculating A/n, B/n, and C/n to obtain three values, and determining the integer corresponding to one of the three values with a smallest difference comparing with n as the number of the LED light pieces arranged on the first side of the regular quadrilateral module;
    S400: calculating a number of LED light pieces arranged on a second side of the regular quadrilateral module according to steps S200 to S300, wherein the second side is adjacent to the first side; and
    S500: continuing to repeat the steps S100-S400 for the number of special-shaped modules obtained in the step S100.

2. The method for seamless splicing of a special-shaped display screen according to claim 1, wherein in the step 100, the regular quadrilateral modules are one or more selected from a group of square modules, rectangular modules, and isosceles trapezoidal modules.

3. The method for seamless splicing of a special-shaped display screen according to claim 1, wherein in the step 100, the regular quadrilateral modules are a plurality of square modules, and sizes of the plurality of square modules are different.

4. The method for seamless splicing of a special-shaped display screen according to claim 1, wherein in the step 100, the regular quadrilateral modules are a plurality of square modules, and sizes of the plurality of square modules are the same.

5. The method for seamless splicing of a special-shaped display screen according to claim 1, wherein in the step 100, the regular quadrilateral modules are a plurality of rectangular modules, and sizes of the plurality of rectangular modules are different.

6. The method for seamless splicing of a special-shaped display screen according to claim 1, wherein in the step 100, the regular quadrilateral modules are a plurality of rectangular modules, and sizes of the plurality of rectangular modules are the same.

7. The method for seamless splicing of a special-shaped display screen according to claim 1, wherein in the step 100, the regular quadrilateral modules are a plurality of isosceles trapezoidal modules, and sizes of the plurality of isosceles trapezoidal modules are different.

8. The method for seamless splicing of a special-shaped display screen according to claim 1, wherein in the step 100, the regular quadrilateral modules are a plurality of isosceles trapezoidal modules, and sizes of the plurality of isosceles trapezoidal modules are the same.

9. The method for seamless splicing of a special-shaped display screen according to claim 1, wherein in the step S200, distances between two LED light pieces arranged at both ends of the first side and an edge of the first side are n/2, and distances between two LED light pieces arranged at both ends of the first side and an edge of the second side are n/2.

10. The method for seamless splicing of a special-shaped display screen according to claim 1, wherein in the step S200, distances between two LED light pieces arranged at both ends of the first side and an edge of the first side are (n−0.05)/2, and distances between two LED light pieces arranged at both ends of the first side and an edge of the second side are (n−0.05)/2.

11. The method for seamless splicing of a special-shaped display screen according to claim 1, wherein in the step S200, distances between two LED light pieces arranged at both ends of the first side and an edge of the first side are ranged from (n−0.05)/2 to n/2, and distances between two LED light pieces arranged at both ends of the first side and an edge of the second side are ranged from (n−0.05)/2 to n/2.

12. The method for seamless splicing of a special-shaped display screen according to claim 1, wherein if the special-shaped display screen is a curved screen, a distance between the first side of the regular quadrilateral module and an outer arc of the curved screen is less than or equal to n.

13. A LED display screen, comprising one or more special-shaped display screens spliced by a method for seamless splicing of a special-shaped display screen; wherein the method comprises the following steps:
- S100: dividing the special-shaped display screen into a number of regular quadrilateral modules and a number of special-shaped modules;
- S200: calculating a number of LED light pieces arranged on a first side of a regular quadrilateral module after step S100 according to a following equation:

$$N=X/n$$

wherein, X is a distance between two LED light pieces arranged at both ends of the first side of the regular quadrilateral module, and n is a distance between two adjacent LED light pieces;
- S300: determining, if the calculated N is an integer, the number of LED light pieces arranged on the first side of the regular quadrilateral module; or
taking, if the calculated N is not an integer, three integers A, B, and C that are closest to N, respectively, calculating A/n, B/n, and C/n to obtain three values, and determining the integer corresponding to one of the three values with a smallest difference comparing with n as the number of the LED light pieces arranged on the first side of the regular quadrilateral module;
- S400: calculating a number of LED light pieces arranged on a second side of the regular quadrilateral module according to steps S200 to S300, wherein the second side is adjacent to the first side; and
- S500: continuing to repeat the steps S100-S400 for the number of special-shaped modules obtained in the step S100.

* * * * *